US012626146B2

(12) United States Patent
Osogami et al.

(10) Patent No.: US 12,626,146 B2
(45) Date of Patent: May 12, 2026

(54) DATA PRUNING IN TREE-BASED FITTED Q ITERATION

(71) Applicant: INTERNATIONAL BUSINESS MACHINES CORPORATION, Armonk, NY (US)

(72) Inventors: Takayuki Osogami, Yamato (JP); Ryo Iwaki, Sumida-ku (JP); Kohei Miyaguchi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1072 days.

(21) Appl. No.: 17/192,308

(22) Filed: Mar. 4, 2021

(65) Prior Publication Data

US 2022/0284306 A1 Sep. 8, 2022

(51) Int. Cl.
*G06N 5/01* (2023.01)
*B60W 50/00* (2006.01)
*G06N 20/20* (2019.01)

(52) U.S. Cl.
CPC ........... *G06N 5/01* (2023.01); *B60W 50/0097* (2013.01); *G06N 20/20* (2019.01); *B60W 2050/0005* (2013.01)

(58) Field of Classification Search
CPC .......... G06N 5/01; G06N 20/20; G06N 3/006; G06N 7/01; B60W 50/0097; B60W 2050/0005
See application file for complete search history.

(56) References Cited

U.S. PATENT DOCUMENTS 11,600,005 B2 * 3/2023 Zhou ...................... G06N 20/00
2020/0394316 A1 * 12/2020 Boehler .............. G06F 21/6245

FOREIGN PATENT DOCUMENTS

CN 108875015 11/2018
CN 110995681 4/2020

OTHER PUBLICATIONS

Neumann, Gerhard. "Fitted Q-Iteration by Advantage Weighted Regression." papers.nips.cc, 2008. https://papers.nips.cc/paper/2008/file/f79921bbae40a577928b76d2fc3edc2a-Paper.pdf. (Year: 2008).*

(Continued)

*Primary Examiner* — Michael H Hoang
(74) *Attorney, Agent, or Firm* — Tutunjian & Bitetto, P.C.; Robert Richard Aragona

(57) ABSTRACT

A computer-implemented method is provided for data reduction in a memory device for machine learning. The method includes storing, in the memory device, data that has been used for training in a tree-based fitted Q iteration session which learns an action value function with an ensemble of decision trees from the data. The method further includes determining, by a processor device, samples to be removed from the data based on a number of samples which belong to leaf nodes of the decision trees. The method also includes removing, from the memory device, the determined samples from the data to reduce an amount of the data. The method additionally includes learning, by the processor device, a new ensemble of decision trees using the data from which the determined samples have been removed together with new data.

20 Claims, 7 Drawing Sheets

(56)         References Cited

OTHER PUBLICATIONS

Ernst, Damien. "Tree-Based Batch Mode Reinforcement Learning." Journal of Machine Learning Research 6 (2005) 503-556, Apr. 2005. https://www.jmlr.org/papers/volume6/ernst05a/ernst05a.pdf. (Year: 2005).*

Castelletti, Andrea et al. Multi-Objective Fitted Q-Iteration: Pareto Frontier Approximation in One Single Run. IEEE. 2011 International Conference on Networking, Sensing and Control Delft, the Netherlands. Apr. 11, 2011. https://ieeexplore.ieee.org/stamp/stamp.jsp?tp=&arnumber=5874921&tag=1 (Year: 2011).*

Ren, Shaoqing, et al. "Global refinement of random forest." Proceedings of the IEEE conference on computer vision and pattern recognition. 2015. https://openaccess.thecvf.com/content_cvpr_2015/papers/Ren_Global_Refinement_of_2015_CVPR_paper.pdf (Year: 2015).*

Wang, Xi-Zhao, Ling-Cai Dong, and Jian-Hui Yan. "Maximum ambiguity-based sample selection in fuzzy decision tree induction." IEEE Transactions on Knowledge and Data Engineering 24.8 (2011): 1491-1505. https://ieeexplore.IEEE.org/stamp/stamp.jsp?tp=&arnumber=5728816 (Year: 2011).*

Zhang, Heping, and Minghui Wang. "Search for the smallest random forest." Statistics and its Interface 2.3 (2009): 381. https://pmc.ncbi.nlm.nih.gov/articles/PMC2822360/ (Year: 2009).*

Carden, Stephen, "Convergence of a Reinforcement Learning Algorithm in Continuous Domains", Clemson University, Tiger Prints, Aug. 2014, 91 pages.

Ernst et al., "Tree-Based Batch Mode Reinforcement Learning", Journal of Machine Learning Research, Apr. 2005, pp. 503-556.

Li et al., "Reinforcement Learning Applications", arXiv:1908.06973v1 [cs.LG] Aug. 19, 2019, pp. 1-41.

Ludovic et al., "Online Reinforcement Learning for Real-Time Exploration in Continuous State and Action Markov Decision Processes", exarXiv:1612.03780v1 [cs.AI] Dec. 12, 2016, 12 pages.

Mell et al. "The NIST Definition of Cloud Computing", NIST Special Publication 800-145, 2011, 7 pages.

* cited by examiner

654C

654N

650

610

654A

654B

DATA PRUNING IN TREE-BASED FITTED Q ITERATION

BACKGROUND

The present invention generally relates to machine learning, and more particularly to data pruning in tree-based fitted Q iteration.

In applications of Reinforcement Learning (RL) to industrial problems (robotics, healthcare, and so forth), one often uses the data that has been collected in advance (batch RL). The additional data collected by RL agents can also be used to retrain the agents but very infrequently (semi-batch RL), only after a large amount of additional data is collected (because of the high cost to test before deployment).

Reinforcement learning aims to determine an optimal control policy from interaction with a system or from observations gathered from a system. In batch mode, it can be achieved by approximating the so-called Q-function based on a set of four-tuples $(x_t, u_t, r_t, x_{t+1})$ where $x_t$ denotes the system state at time t, $u_t$ the control action taken, $r_t$ the instantaneous reward obtained and $x_{t+1}$ the successor state of the system, and by determining the control policy from this Q-function. The Q-function approximation may be obtained from the limit of a sequence of (batch mode) supervised learning problems.

In such batch or semi-batch RL for industrial applications, Tree-based Fitted Q Iteration is known to outperform other techniques. The policies found with Tree-based Fitted Q Iteration are known to have the highest performance with ensemble methods (extremely or totally randomized trees, gradient tree boosting), which however require increased computational cost particularly at the time of training. Even if the time for a single run of training is acceptable, Tree-based Fitted Q Iteration has several key hyperparameters and significantly benefits from a grid search which requires many runs of training.

SUMMARY

According to aspects of the present invention, a computer-implemented method is provided for data reduction in a memory device for machine learning. The method includes storing, in the memory device, data that has been used for training in a tree-based fitted Q iteration session which learns an action value function with an ensemble of decision trees from the data. The method further includes determining, by a processor device, samples to be removed from the data based on a number of samples which belong to leaf nodes of the decision trees. The method also includes removing, from the memory device, the determined samples from the data to reduce an amount of the data. The method additionally includes learning, by the processor device, a new ensemble of decision trees using the data from which the determined samples have been removed together with new data.

According to other aspects of the present invention, a computer program product is provided for data reduction in a memory device for machine learning. The computer program product includes a non-transitory computer readable storage medium having program instructions embodied therewith. The program instructions are executable by a computer to cause the computer to perform a method. The method includes storing, in the memory device, data that has been used for training in a tree-based fitted Q iteration session which learns an action value function with an ensemble of decision trees from the data. The method further includes determining, by a processor device, samples to be removed from the data based on a number of samples which belong to leaf nodes of the decision trees. The method also includes removing, from the memory device, the determined samples from the data to reduce an amount of the data. The method additionally includes learning, by the processor device, a new ensemble of decision trees using the data from which the determined samples have been removed together with new data.

According to yet other aspects of the present invention, a computer processing system is provided for data reduction in a memory device for machine learning. The system includes a memory device configured to store program code. The system further includes a processor device operatively coupled to the memory device for running the program code to store, in the memory device, data that has been used for training in a tree-based fitted Q iteration session which learns an action value function with an ensemble of decision trees from the data. The processor further runs the program code to determine samples to be removed from the data based on a number of samples which belong to leaf nodes of the decision trees. The processor also runs the program code to remove, from the memory device, the determined samples from the data to reduce an amount of the data. The processor additionally runs the program code to learn a new ensemble of decision trees using the data from which the determined samples have been removed together with new data.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
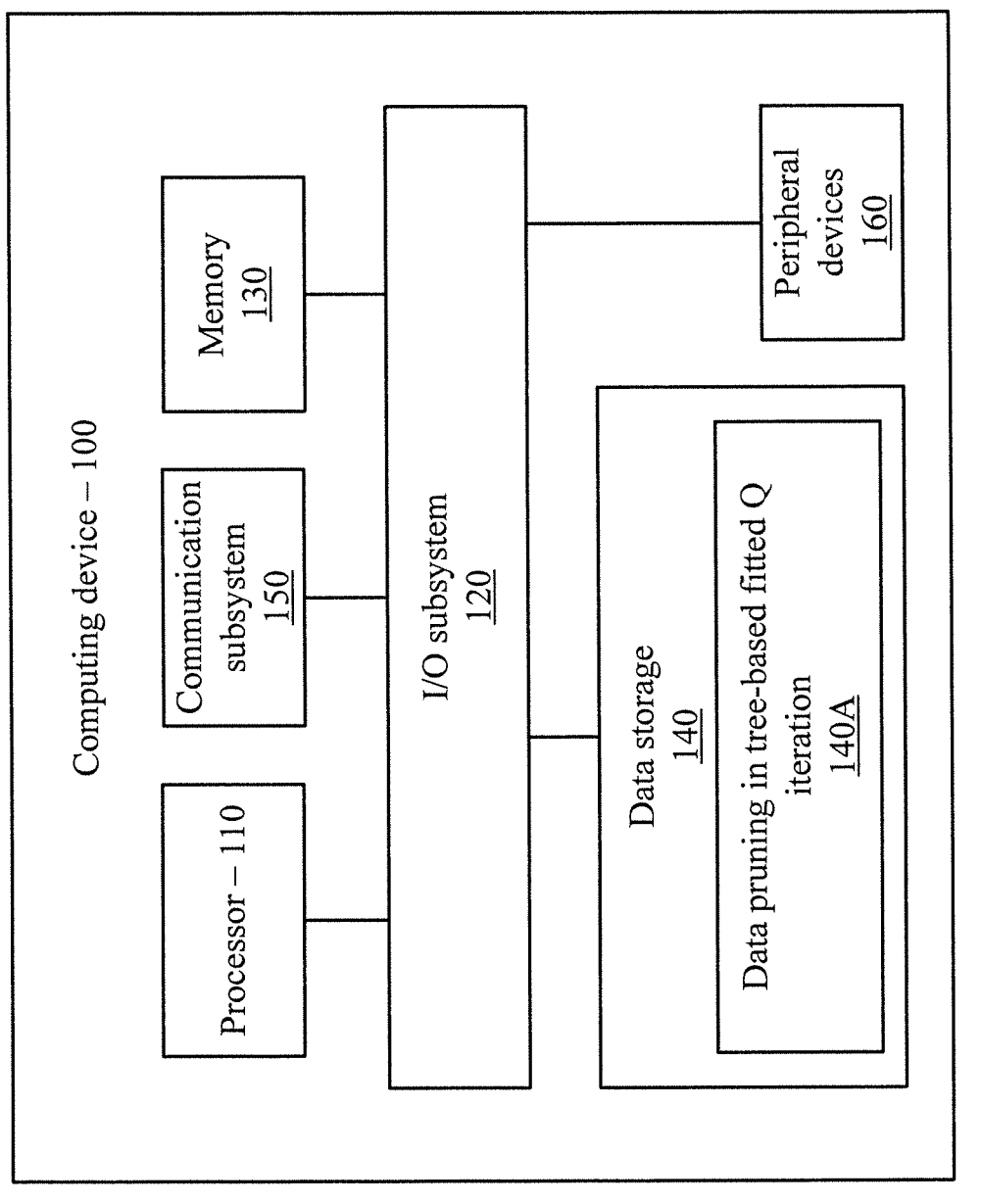
FIG. 1 is a block diagram showing an exemplary computing device, in accordance with an embodiment of the present invention.

Embodiments of the present invention are directed to data pruning in tree-based fitted Q iteration.

Embodiments of the present invention reduce the training time of a Tree-based Fitted Q Iteration technique with ensemble method when applied in a semi-batch manner. The phrase "semi-batch manner" means that the training is run iteratively, where in each iteration a new set of data becomes available for training. This is achieved by reducing the amount of data that is considered in an iteration of a Tree-based Fitted Q Iteration technique using a data removal sampling technique in accordance with the present invention. In an embodiment, the ensemble method can be gradient tree boosting, or other tree-based methods such as, for example, but not limited to, random forests and extra trees.

In one or more embodiments of the present invention, a method for data reduction is provided in relation to repeated application of tree-based fitted Q iteration (Tree-FQI) which learns an action-value function with (an ensemble of) decision trees. After an application of Tree-FQI, the data that has been used for training is pruned by removing some of the samples from the data. The decision of whether a sample is removed or not is determined on the basis of the information about the leaves (or more generally nodes of the decision trees) that the sample belongs to. In an embodiment, any statistic can be used in relation to leaves (nodes) including, but not limited, to, average, minimum, maximum, median, and so forth. In an embodiment, the statistics are used in relation to a threshold pruning number. The threshold pruning number is selected based on preliminary experiments, or it may be gradually reduced from a sufficiently large number until a sufficient number of data samples are removed to make the next iteration computationally tractable. The rationale for pruning data based on leaf (node) information (e.g., statistics) is based on the observation that the data samples belonging to the same leaf in a tree are similar to each other. Hence, if many data samples belong to the same leaf, some of the data samples can be removed without affecting the quality of the trained model. Since an ensemble model includes multiple trees, each data sample belongs to multiple leaves, each corresponding to a tree in the ensemble model. Thus, a data sample should be removed if, for each tree in the ensemble model, it belongs to the leaf where many data samples belong. Therefore, a decision as to whether a data sample should be pruned is made on the basis of the statistics about the number of data samples in leaves where that data sample belong.

Tree-based Fitted Q iteration is a technique that allows fitting (using a set of four-tuples) any (parametric or non-parametric) approximation architecture to the Q-function.

The fitted Q iteration algorithm is a batch mode reinforcement learning algorithm which yields an approximation of the Q-function corresponding to an infinite or finite horizon optimal control problem with discounted rewards, by iteratively extending the optimization horizon. At the first iteration, it produces an approximation of a $Q_1$-function corresponding to a 1-step optimization. Since the true $Q_1$-function is the conditional expectation of the instantaneous reward given the state-action pair (i.e., $Q_1(x,u)=E[r_t|x_t=x,u_t=u]$), an approximation of it can be constructed by applying a (batch mode) regression algorithm to a training set whose inputs are the pairs $(x_t, u_t)$ and whose target output values are the instantaneous rewards $r_t$ (i.e., $q_{1,t}=r_t$). The Nth iteration derives (using a batch mode regression algorithm) an approximation of a $Q_N$-function corresponding to an N-step optimization horizon. The training set at this step is obtained by merely refreshing the output values of the training set of the previous step by using the "value iteration" based on the approximate $Q_N$-function returned at the previous step (i.e., $q_{N,t}=r_t+\gamma\max_u Q_{N-1}(x_t+1,u)$, where $\gamma\in[0, 1)$ is the discount factor).

In an embodiment, inputs to a Tree-based Fitted Q iteration session can be as follows:

Input: $\{s_t, a_t, r_t, s_{t+1}\}_{t=0, 1, \ldots, T}, \gamma$ where
 $s_t$: state at time t
 $a_t$: action at time t
 $r_t$: reward at time t
 $\gamma$: discount factor As a preparation, the pair of the state and the action at each time t is converted to a vector of features. Namely, $X_{t,:}\leftarrow(s_t, a_t)$. For notational convenience, let X be the matrix where the t-th row of the matrix is the feature vector of state-action pair at time t.

After the preparation, the following is repeated until a stopping condition is met. For example, one may repeat the following 10 times. First, for each time t, we compute an estimate of the action-value of $(s_t, a_t)$, which is the maximum cumulative reward that can be obtained from $(s_t, a_t)$, on the basis of the current estimate the action-value function. Namely, let the estimate of the action-value of $(s_t, a_t)$ be $$y_t \leftarrow r_t + \gamma \max_a \hat{Q}(s_{t+1}, a),$$

where max is over all possible actions. Here, $\hat{Q}(s_{t+1}, a)$ is the current estimate of the action-value of the pair of the state $s_{t+1}$ and the action a. For notational convenience, let y be the vector whose t-th element is $y_t$. At the beginning of the repetition, $\hat{Q}$ can be initialized in a way that it returns 0 for any state-action pair. Second, the estimate of the action-value function is updated. This update is performed by fitting a regressor, which is an ensemble of trees, from input X to output y. The new regressor replaces $\hat{Q}$. Namely, $\hat{Q}\leftarrow$regressor.fit(X, y).

In an embodiment, the fitted Q iteration algorithm computes, from a set of four-tuples, an approximation of the action-value function, which in turn gives the optimal stationary policy. Of course, other policy types can also be approximated, as readily appreciated by one of ordinary skill in the art given the teachings of the present invention provided herein.

FIG. 1 is a block diagram showing an exemplary computing device 100, in accordance with an embodiment of the present invention. The computing device 100 is configured to perform data pruning in tree-based fitted Q iteration.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for data pruning in tree-based fitted Q iteration. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
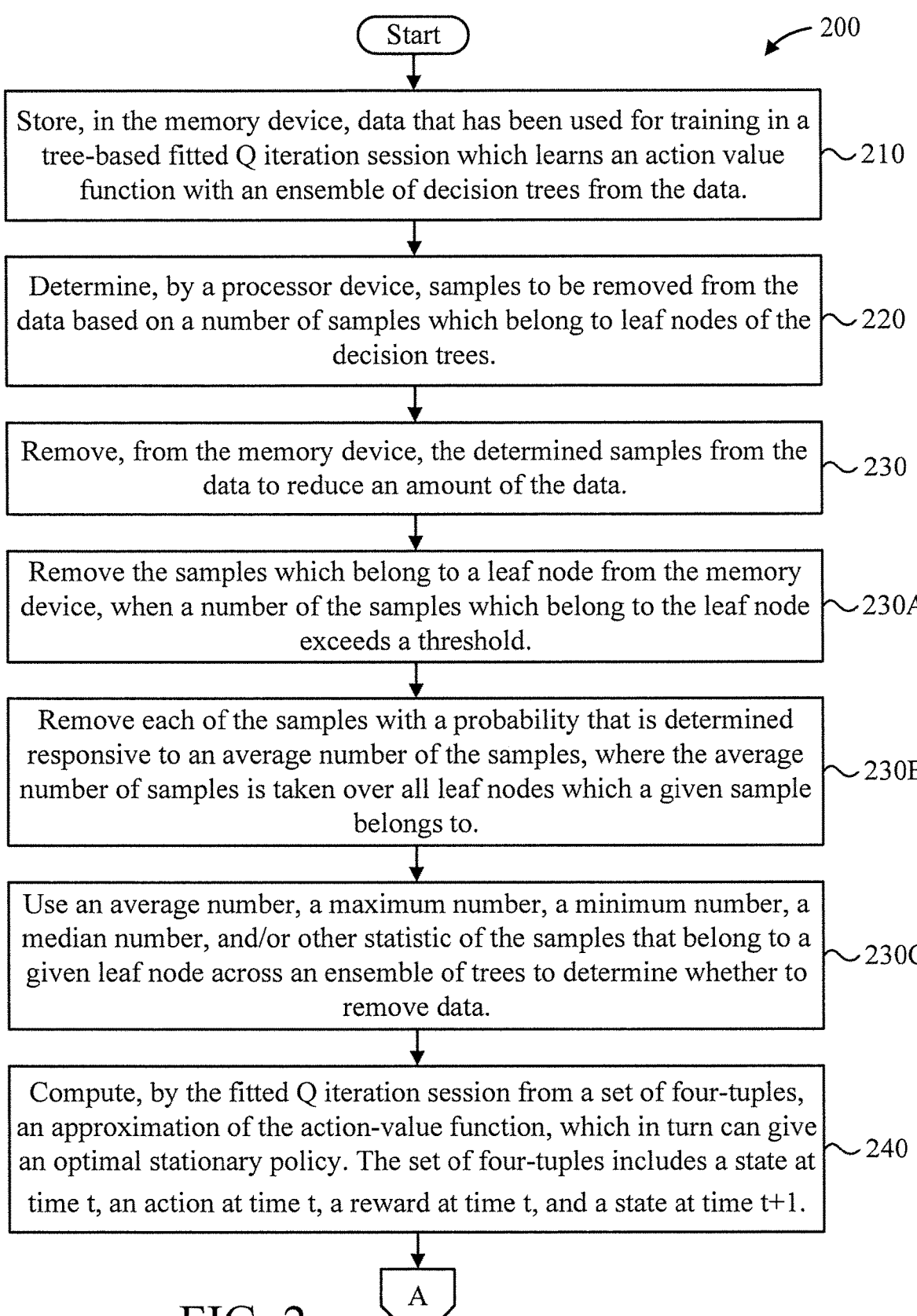
FIGS. 2-3 are flow diagrams showing an exemplary method for data pruning in tree-based fitted Q iteration, in accordance with an embodiment of the present invention.
Figure 3:
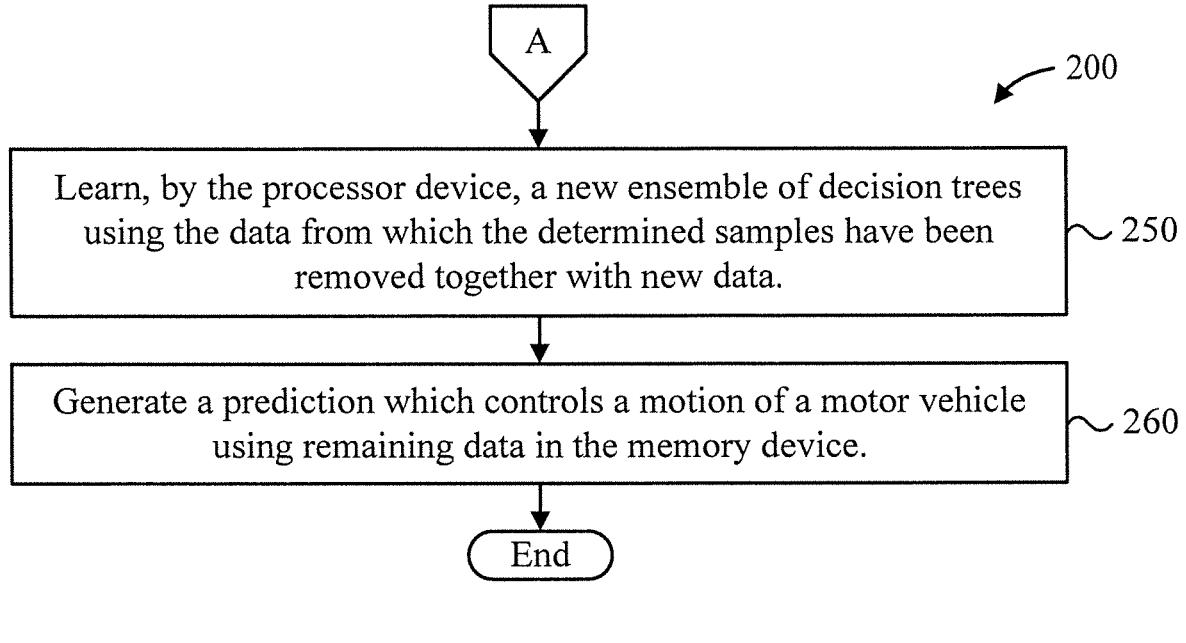

These and other variations of a hardware processor subsystem are also contemplated in accordance with embodiments of the present invention FIGS. 2-3 are flow diagrams showing an exemplary method 200 for data pruning in tree-based fitted Q iteration, in accordance with an embodiment of the present invention.

The method 200 can also be considered a method for data reduction in a memory device for machine learning.

At block 210, store, in the memory device, data that has been used for training in a tree-based fitted Q iteration session which learns an action value function with an ensemble of decision trees from the data.

At block 220, determine, by a processor device, samples to be removed from the data based on a number of samples which belong to leaf nodes of the decision trees.

At block 230, remove, from the memory device, the determined samples from the data to reduce an amount of the data.

In an embodiment, block 230 can include one or more of blocks 230A through 230B.

At block 230A, remove the samples which belong to a leaf node from the memory device, when a number of the samples which belong to the leaf node exceeds a threshold.

At block 230B, remove each of the samples with a probability that is determined responsive to an average number of the samples, where the average is taken over all of the leaves which the given sample belongs to.

At block 230C, use an average number, a maximum number, a minimum number, a median number, and/or other statistic of the samples that belong to a given leaf node across an ensemble of trees to determine whether to remove data. To that end an ensemble of trees is used as a regressor. Each data sample belongs to one of the leaves in each tree. Consider a particular data sample d*. If an ensemble of K trees is used as a regressor, then the data sample d* belong to K leaves. For each such K leaves, the number of data samples that belong to that leaf can be counted. Let $n_k$ be the number of data samples that belong to leaf k for k=1 . . . K. Then the average, maximum, minimum, or other statistics of $\{n_1, \ldots, n_k\}$ can be used to determine whether to remove the data sample d*.

At block 240, compute, by the fitted Q iteration session from a set of four-tuples, an approximation of the action-value function, which in turn can give an optimal stationary policy. The set of four-tuples includes a state at time t, an action at time t, a reward at time t, and a state at time t+1.

At block 250, learn, by the processor device, a new ensemble of decision trees using the data from which the determined samples have been removed together with new data. Namely, the tree-based fitted Q iteration hereinbefore is applied with the dataset that consists of the data that have been used for training from which the determined samples have been removed together with new data. In an embodiment, the storing (block 210), determining block 220), removing (block 230), and learning (block 250) blocks can be repeated recursively. In this way, one can efficiently learn the action-value function by taking into account not both the previously available data and the new data. Notice that one cannot efficiently learn the action-value function if all of the previously available data and the new data are used due to be the volume of the data. Also, the action-value function that is learned on the basis of the new data only would not well represent the true action-value function. By pruning the previously available data and using both the pruned data and the new data, one can efficiently learn the action-value function that well represent the true action-value function.

At block 260, generate a prediction which controls a motion of a motor vehicle using remaining data in the memory device.

Figure 4:
FIG. 4 is a block diagram showing an exemplary architecture for data pruning in tree-based fitted Q iteration, in accordance with an embodiment of the present invention.

FIG. 4 is a block diagram showing an exemplary architecture 400 for data pruning in tree-based fitted Q iteration, in accordance with an embodiment of the present invention.

Data 410 is subjected to tree-FQI 420 such that 440 data is pruned from the decision trees 430 based on certain criteria relating to leaf (node) statistics (average, minimum, maximum, median, and so forth). The pruned data 440, together with new data 450, are used to learn a new set of decision trees 470 when subjected to another tree-FQI 460.

Figure 5:
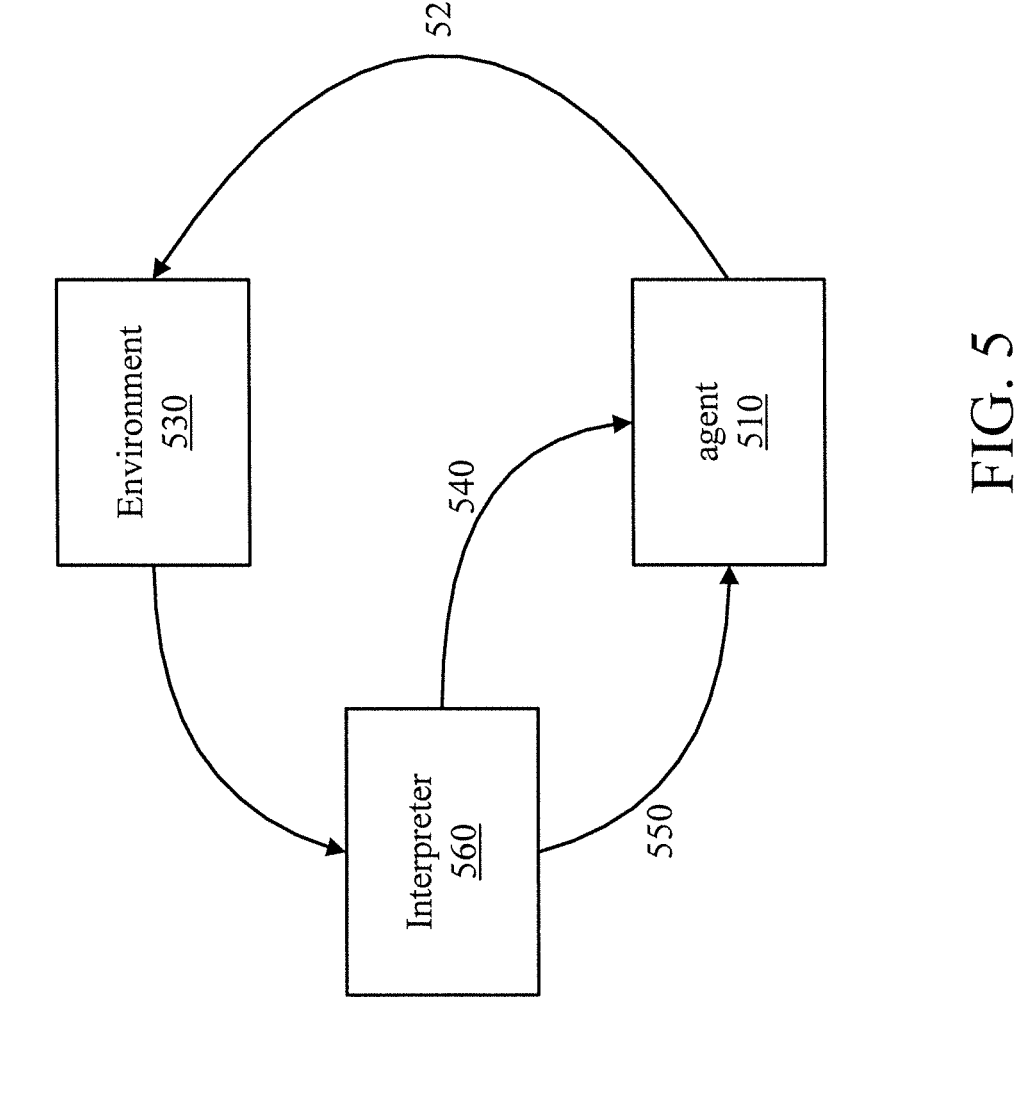
FIG. 5 is a block diagram showing an overall exemplary Reinforcement Learning (RL) architecture, in accordance with an embodiment of the present invention.

FIG. 5 is a block diagram showing an overall exemplary Reinforcement Learning (RL) architecture 500, in accordance with an embodiment of the present invention.

The typical framing of a Reinforcement Learning (RL) scenario: an agent 510 takes actions 520 in an environment 530, which is interpreted by an interpreter 560 into a reward 540 and a representation of the state 550, which are fed back to the agent 510. The RL scenario here is specifically applied using fitted Q iteration to obtain optimal results, and modified by the present invention to reduce the data and corresponding training time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
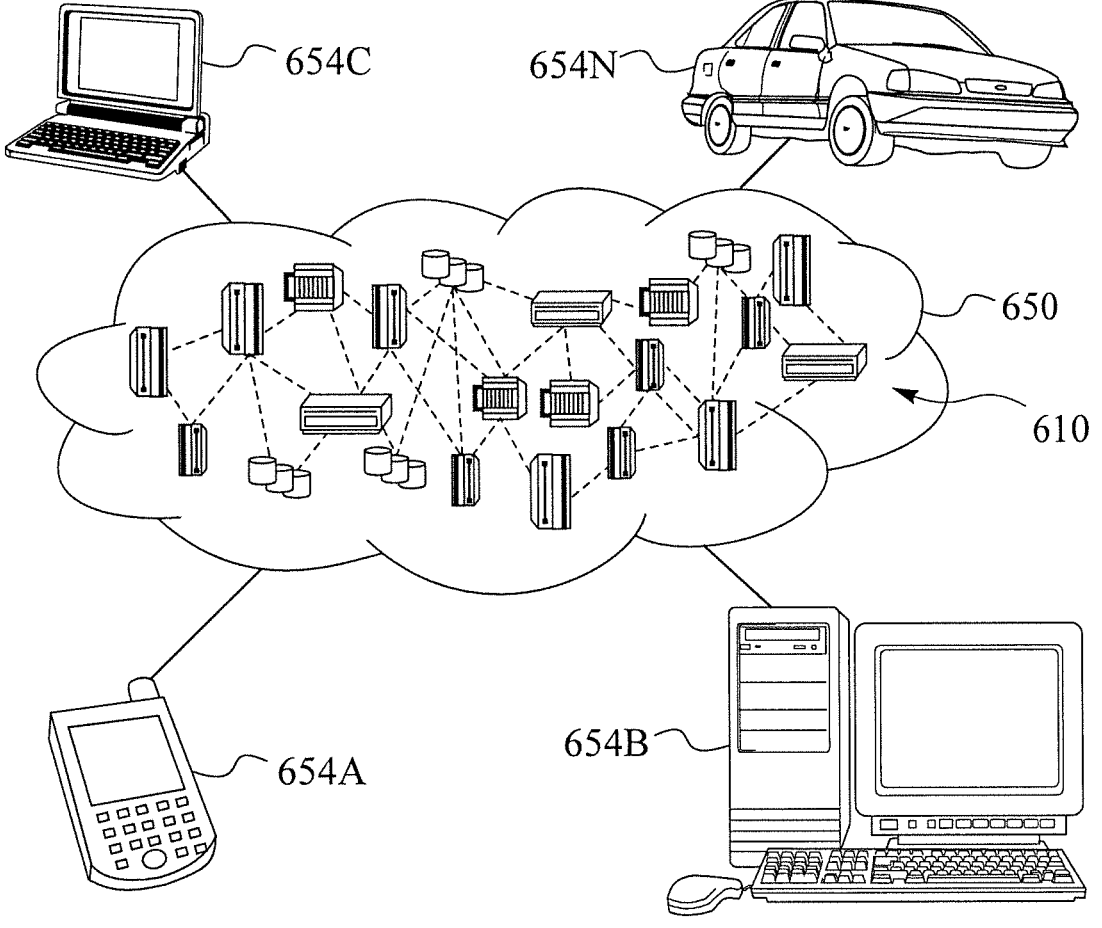
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
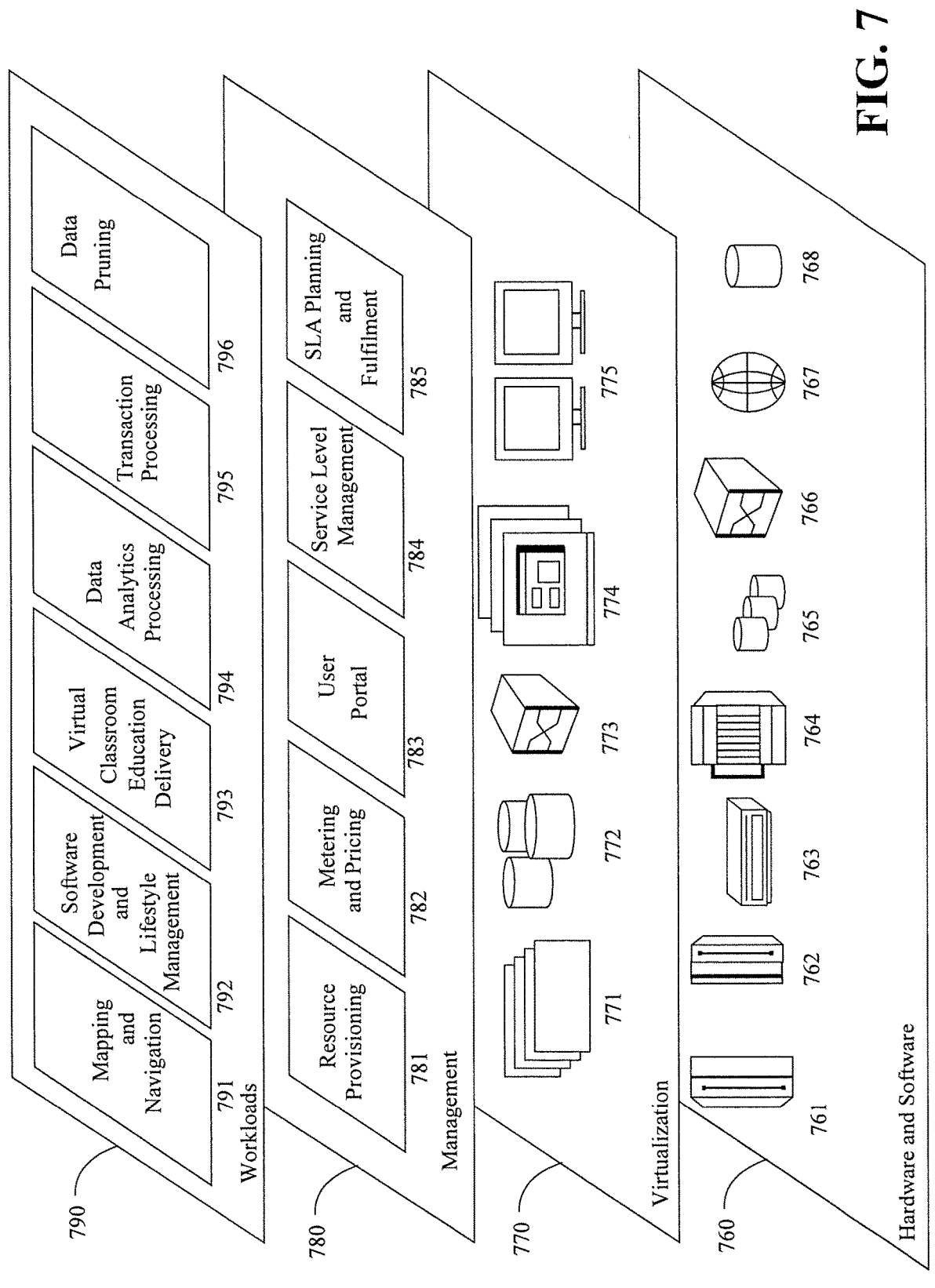
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and data pruning in tree-based fitted Q iteration 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for data reduction in a memory device for machine learning, comprising:
    storing, in the memory device, data that has been used for training in a tree-based fitted Q iteration session which learns an action value function with an ensemble of decision trees from the data;

determining, by a processor device, samples to be removed from the data based on a number of samples which belong to leaf nodes of the decision trees having identical positions within different decision trees from the ensemble of decision trees based on sample similarity to obtain determined samples;

removing, from the memory device, the determined samples from the data to reduce an amount of the data based on determined leaf node statistics for sample similarity by using the ensemble of decision trees as a regressor to obtain pruned data; and learning, by the processor device, a new ensemble of decision trees using the pruned data together with new data.

2. The computer-implemented method of claim 1, wherein the samples which belong to a leaf node are removed from the memory device, when a number of the samples which belong to the leaf node exceeds a pruning threshold based on sample similarity.

3. The computer-implemented method of claim 1, wherein said storing, determining, removing, and learning steps are repeated recursively to efficiently learn a true action-value function representing the pruned data and the new data.

4. The computer-implemented method of claim 1, wherein each of the samples is removed with a probability that is determined responsive to an average number of the samples, where the average number of samples is taken over all leaf nodes which a given sample belongs to.

5. The computer-implemented method of claim 1, wherein the number of samples used to determine whether to remove data comprises an average number of samples that belong to a given leaf node.

6. The computer-implemented method of claim 1, wherein the number of samples used to determine whether to remove data comprises a minimum number of samples that belong to a given leaf node.

7. The computer-implemented method of claim 1, wherein the number of samples used to determine whether to remove data comprises a maximum number of samples that belong to a given leaf node.

8. The computer-implemented method of claim 1, wherein the number of samples used to determine whether to remove data comprises a median of samples that belong to a given leaf node.

9. The computer-implemented method of claim 1, wherein the machine learning comprises a gradient tree boosting process.

10. The computer-implemented method of claim 1, further comprising generating a prediction which controls a motion of a motor vehicle using remaining data in the memory device.

11. The computer-implemented method of claim 1, wherein the fitted Q iteration session computes, from a set of four-tuples, an approximation of an optimal stationary policy, and wherein the set of four-tuples comprises a state at time t, an action at time t, a reward at time t, and a discount factor $\gamma$.

12. A computer program product for data reduction in a memory device for machine learning, the computer program product comprising a non-transitory computer readable storage medium having program instructions embodied therewith, the program instructions executable by a computer to cause the computer to perform a method comprising:

storing, in the memory device, data that has been used for training in a tree-based fitted Q iteration session which learns an action value function with an ensemble of decision trees from the data;

determining, by a processor device, samples to be removed from the data based on a number of samples which belong to leaf nodes of the decision trees having identical positions within different decision trees from the ensemble of decision trees based on sample similarity to obtain determined samples;

removing, from the memory device, the determined samples from the data to reduce an amount of the data based on determined leaf node statistics for sample similarity by using the ensemble of decision trees as a regressor to obtain pruned data; and learning, by the processor device, a new ensemble of decision trees using the pruned data together with new data.

13. The computer program product of claim 12, wherein the samples which belong to a leaf node are removed from the memory device, when a number of the samples which belong to the leaf node exceeds a pruning threshold based on sample similarity.

14. The computer program product of claim 12, wherein said storing, determining, removing, and learning steps are repeated recursively to efficiently learn a true action-value function representing the pruned data and the new data.

15. The computer program product of claim 12, wherein each of the samples is removed with a probability that is determined responsive to an average number of the samples, where the average number of samples is taken over all leaf nodes which a given sample belongs to.

16. The computer program product of claim 12, wherein the number of samples used to determine whether to remove data comprises an average number of samples that belong to a given leaf node.

17. The computer program product of claim 12, wherein the number of samples used to determine whether to remove data comprises a minimum number of samples that belong to a given leaf node.

18. The computer program product of claim 12, wherein the number of samples used to determine whether to remove data comprises a maximum number of samples that belong to a given leaf node.

19. The computer program product of claim 12, wherein the number of samples used to determine whether to remove data comprises a median of samples that belong to a given leaf node.

20. A computer processing system for data reduction in a memory device for machine learning, comprising:

a memory device configured to store program code;

a processor device operatively coupled to the memory device for running the program code to store, in the memory device, data that has been used for training in a tree-based fitted Q iteration session which learns an action value function with an ensemble of decision trees from the data;

determine samples to be removed from the data based on a number of samples which belong to leaf nodes of the decision trees having identical positions within different decision trees from the ensemble of decision trees based on sample similarity to obtain determined samples;

remove, from the memory device, the determined samples from the data to reduce an amount of the data based on leaf node statistics for sample similarity by using the ensemble of decision trees as a regressor to obtain pruned data; and learn a new ensemble of decision trees using the pruned data together with new data.

\* \* \* \* \*